United States Patent
Hamamoto et al.

(10) Patent No.: US 12,516,915 B2
(45) Date of Patent: Jan. 6, 2026

(54) THREAT COUNTERMEASURE SYSTEM AND THREAT COUNTERMEASURE METHOD

(71) Applicant: MITSUBISHI HEAVY INDUSTRIES, LTD., Tokyo (JP)

(72) Inventors: Koichi Hamamoto, Tokyo (JP); Atsushi Ochiai, Tokyo (JP); Tomoya Morioka, Tokyo (JP); Tomoya Arisue, Tokyo (JP); Shingo Nishikata, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 94 days.

(21) Appl. No.: 18/704,295

(22) PCT Filed: Aug. 22, 2022

(86) PCT No.: PCT/JP2022/031540
§ 371 (c)(1),
(2) Date: Apr. 24, 2024

(87) PCT Pub. No.: WO2023/074095
PCT Pub. Date: May 4, 2023

(65) Prior Publication Data
US 2024/0418482 A1    Dec. 19, 2024

(30) Foreign Application Priority Data
Oct. 27, 2021 (JP) ................. 2021-175405

(51) Int. Cl.
*F41H 13/00* (2006.01)
*B64U 10/13* (2023.01)
(Continued)

(52) U.S. Cl.
CPC .......... *F41H 13/005* (2013.01); *B64U 10/13* (2023.01); *F41H 11/02* (2013.01); *B64U 2101/15* (2023.01)

(58) Field of Classification Search
CPC ....... F41H 13/005; F41H 11/02; B64U 10/13; B64U 2101/15
(Continued)

(56) References Cited

U.S. PATENT DOCUMENTS 10,866,597 B1 * 12/2020 Reinhold ............. G05D 1/0027
2017/0059282 A1    3/2017 Schlosser
(Continued)

FOREIGN PATENT DOCUMENTS

| JP | 5960934 | 8/2016 |
|---|---|---|
| JP | 2017-15311 | 1/2017 |

(Continued)

OTHER PUBLICATIONS

International Search Report issued Oct. 4, 2022 in corresponding International Application No. PCT/JP2022/031540.

*Primary Examiner* — Samir Abdosh
(74) *Attorney, Agent, or Firm* — Wenderoth, Lind & Ponack, L.L.P.

(57) ABSTRACT

Provided are a threat-countering system and a threat-countering method for efficiently countering incoming threats by using laser irradiation. The threat-countering system comprises a countering device, a deterrent device, and a decision device. The countering device detects incoming threats and counters the threats by using laser irradiation. The deterrent device is installed to prevent threats from approaching a protected object through a deterrent region in which the power of the laser irradiation is assumed to be lower than a predetermined threshold. The decision device decides the (Continued)

1: THREAT COUNTERMEASURE SYSTEM position of the upper end of the deterrent device on the basis of the upper end of the deterrent region.

9 Claims, 8 Drawing Sheets

(51) Int. Cl.
  *F41H 11/02* (2006.01)
  *B64U 101/15* (2023.01)
(58) Field of Classification Search
  USPC .......................................................... 89/1.8
  See application file for complete search history.

(56) References Cited

U.S. PATENT DOCUMENTS

| | | | |
|---|---|---|---|
| 2018/0080747 | A1 | 3/2018 | Nishikata et al. |
| 2018/0335779 | A1 | 11/2018 | Fisher et al. |
| 2019/0063881 | A1 | 2/2019 | Abramov et al. |
| 2019/0129427 | A1 | 5/2019 | Sugaki et al. |
| 2020/0025531 | A1 | 1/2020 | Jung et al. |
| 2020/0041234 | A1 | 2/2020 | Abramov et al. |
| 2020/0064845 | A1 | 2/2020 | Sugaki et al. |
| 2020/0284557 | A1* | 9/2020 | Madhav ................ H04N 7/188 |
| 2020/0363824 | A1* | 11/2020 | Levin ................... G01S 13/862 |
| 2022/0163670 | A1 | 5/2022 | Ochiai et al. |
| 2023/0168675 | A1 | 6/2023 | Fisher et al. |

FOREIGN PATENT DOCUMENTS

| | | |
|---|---|---|
| JP | 6413057 | 10/2018 |
| JP | 2019-60589 | 4/2019 |
| JP | 2019-534441 | 11/2019 |
| JP | 2020-519843 | 7/2020 |
| JP | 2021-14958 | 2/2021 |
| WO | 2008/114261 | 9/2008 |

* cited by examiner

1: THREAT COUNTERMEASURE SYSTEM

1: THREAT COUNTERMEASURE SYSTEM

1: THREAT COUNTERMEASURE SYSTEM

1: THREAT COUNTERMEASURE SYSTEM

THREAT COUNTERMEASURE SYSTEM AND THREAT COUNTERMEASURE METHOD

TECHNICAL FIELD

The present invention relates to a threat countermeasure system and a threat countermeasure method, and for example, the present invention can be suitably used for a countermeasure against an incoming threat.

BACKGROUND ART

In recent years, a technique related to an unmanned aerial vehicle (UAV) such as a drone has been advanced and has become a threat in defending a protection target. In response to such a threat, a threat countermeasure system has been considered in which a high-output laser beam is caused to propagate into the atmosphere and is emitted to the threat to remotely destroy a target. The high-output laser beam driven by electricity can continue to counter the threat as long as a power source can be secured, and costs thereof are low as compared with a case where a bombshell, a missile, or the like is used.

On the other hand, it is conceivable that an aerial threat such as a drone flies at a low altitude near a ground such that the aerial threat is difficult to be detected by a radar or the like. In general, in the air near the ground, a degree of atmospheric fluctuation is larger than in the sky at a higher altitude. In particular, in a case where the ground receives strong sunlight in fine weather, the degree of atmospheric fluctuation of the air near the ground increases. A refractive index structure constant $Cn^2$ (unit: $m^{-2/3}$) is one of indexes for measuring the degree of atmospheric fluctuation. The degree of atmospheric fluctuation is larger as the refractive index structure constant $Cn^2$ is larger.

In a case where the degree of atmospheric fluctuation is large, it becomes difficult to focus the laser beam, and lethality of the laser beam against the target is reduced. As a result, in a case where the aerial threat flies at a low altitude near the ground, the lethality of the laser beam against the aerial threat may be reduced as compared with a case where the aerial threat flies in the sky.

In relation to the above, PTL 1 (Japanese Patent No. 5960934) discloses an invention relating to a protective building. The protective building of PTL 1 is means for physically protecting a protection target on an inner side thereof from an attack from the sky on an outer side thereof, and does not take into consideration a countermeasure by laser irradiation, the influence of atmospheric fluctuation in a low altitude, or the like.

Further, PTL 2 (Japanese Patent No. 6413057) discloses an invention relating to an unmanned aerial vehicle and a moving body supplementary system. The unmanned aerial vehicle and the moving body supplementary system of PTL 2 are means for restraining a target with a restraint network ejected from the unmanned aerial vehicle, and do not take into consideration a countermeasure by laser irradiation, the influence of atmospheric fluctuation in a low altitude, or the like.

Further, PTL 3 (Japanese Unexamined Patent Application Publication No. 2019-60589) discloses an aviation defense system. The aviation defense system of PTL 3 is means for neutralizing an aircraft of opponent by emitting a laser beam or the like from a target neutralization device mounted on an aircraft of ally, and does not take into consideration the influence of atmospheric fluctuation in a low altitude, or the like.

Further, PTL 4 (PCT Japanese Translation Patent Publication No. 2020-519843) discloses a method of intercepting an unmanned aerial vehicle. The method of PTL 4 is means for capturing a target by launching a net or the like from an aircraft of ally, and does not take into consideration a countermeasure by laser irradiation, the influence of atmospheric fluctuation in a low altitude, or the like.

Further, PTL 5 (Japanese Unexamined Patent Application Publication No. 2021-014958) discloses a threat countermeasure system. The threat countermeasure system of PTL 5 emits a laser beam to counter a threat, but does not take into consideration the influence of atmospheric fluctuation on the laser beam, blocking of flying of the threat at a low altitude, or the like.

CITATION LIST

Patent Literature

[PTL 1] Japanese Patent No. 5960934
[PTL 2] Japanese Patent No. 6413057
[PTL 3] Japanese Unexamined Patent Application Publication No. 2019-60589
[PTL 4] PCT Japanese Translation Patent Publication No. 2020-519843
[PTL 5] Japanese Unexamined Patent Application Publication No. 2021-014958

SUMMARY OF INVENTION

In view of the above circumstances, one of purposes of the present disclosure is to provide a threat countermeasure system and a threat countermeasure method that efficiently counter an incoming threat with laser irradiation. Other issues and novel features will become apparent from description and accompanying drawings of the present specification.

According to an embodiment, a threat countermeasure system includes a countermeasure device, a blocking device, and a decision device. The countermeasure device detects an incoming threat and counters the threat with laser irradiation. The blocking device is installed so as to block the approach of the threat to a protection target through a block region in which lethality of the laser irradiation is presumed to be lower than a predetermined threshold value. The decision device decides a position of an upper end of the blocking device based on an upper end of the block region.

According to an embodiment, a threat countermeasure method includes deciding a position of an upper end of a blocking device based on an upper end of a block region in which lethality of laser irradiation is presumed to be lower than a predetermined threshold value, installing the blocking device to block passage of an incoming threat through the block region to approach a protection target, and detecting the threat to counter the threat with the laser irradiation.

According to an embodiment, it is possible to efficiently counter the incoming threat with the laser irradiation.

DESCRIPTION OF EMBODIMENTS

Embodiments for implementing a threat countermeasure system and a threat countermeasure method according to the present disclosure will be described below with reference to accompanying drawings.

RELATED ART

Figure 1:
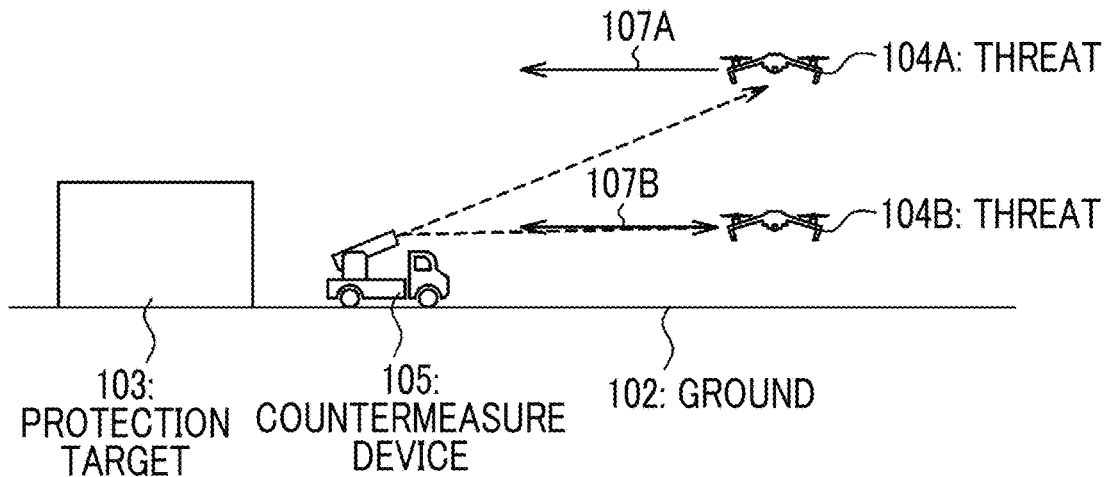
FIG. 1 is a diagram showing a configuration example of a threat countermeasure system in the related art.

In order to better understand the issues, a threat countermeasure system in the related art will be described first. As shown in FIG. 1, a threat countermeasure system 101 in the related art includes a countermeasure device 105 installed on a ground 102. In order to defend a protection target 103, the countermeasure device 105 counters incoming threats 104A and 104B with laser irradiation. In this case, a laser beam emitted to the threat 104A passing through a path 107A having a relatively high altitude is focused with sufficient accuracy to counter the threat 104A. As an example, in a case where the threat 104A is a multicopter type drone including a plurality of rotor blades, the countermeasure device 105 performs the countering such that the rotor blade included in the threat 104A, a computer circuit for controlling the threat 104A, or the like is heated by energy of the focused laser beam and thus falls into malfunction or structural destruction.

On the other hand, the air in a space relatively close to the ground 102 is likely to generate atmospheric fluctuation, such as heat haze, due to being heated by the ground 102 or the like, and the laser beam is more difficult to be focused as a degree of atmospheric fluctuation is larger. Therefore, even though there is an attempt to counter the threat 104B passing through a path 107B having a relatively low altitude with the laser irradiation, lethality of the laser beam emitted to the threat 104B may be insufficient. In other words, the lethality of the laser beam needs to reach a predetermined threshold value in order to cause the threat 104B to fall into malfunction or structural destruction. In a case where the lethality of the laser beam that is not sufficiently focused due to the influence of atmospheric fluctuation or the like is lower than the threshold value, it is difficult to counter the threat 104B with the laser irradiation.

The degree of atmospheric fluctuation can be represented, for example, as a refractive index structure constant $Cn^2$. As the refractive index structure constant $Cn^2$ is larger, the degree of atmospheric fluctuation is larger, a degree of focusing of the laser beam is lower, and the lethality of the laser beam against the threat 104B is smaller. A second threshold value is defined for the refractive index structure constant $Cn^2$ in correspondence with a first threshold value at which the lethality of the laser beam is sufficient to counter the threat 104B. In a case where the first threshold value is provided, the second threshold value can be obtained and defined with calculation of the lethality of the laser beam. Characteristics of a threat countermeasure system 1, such as the power, wavelength, and divergence angle of the laser beam and the aiming accuracy of the threat countermeasure system 1, a distance of the threat, an atmospheric transmission rate, and the like may be used in the calculation of the lethality of the laser beam. Further, the second threshold value may be empirically set from a test result relating to the lethality of the laser beam or the like.

First Embodiment

Figure 2A:
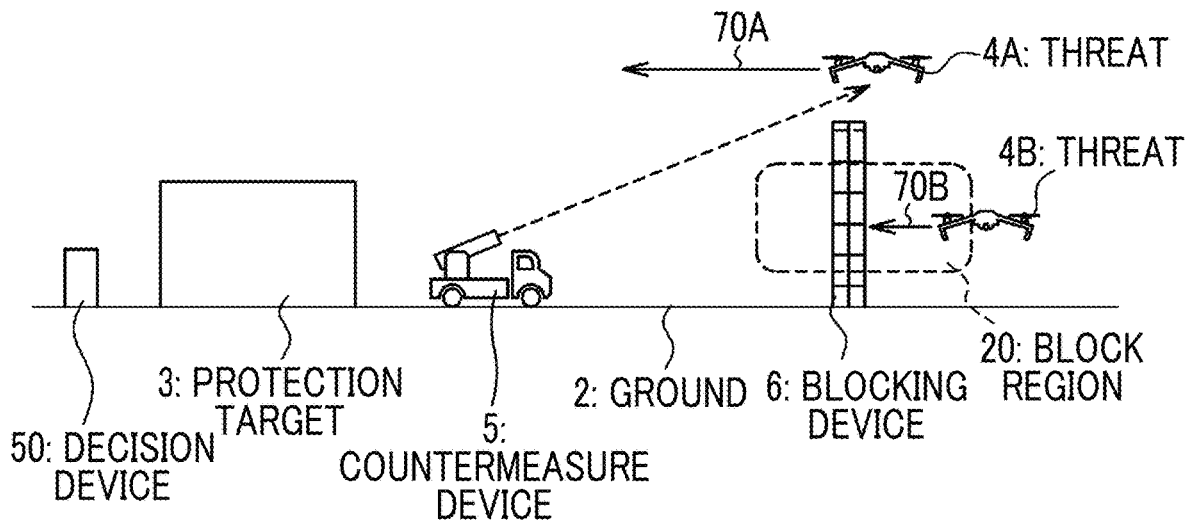
FIG. 2A is a diagram showing a configuration example of a threat countermeasure system according to an embodiment.

As shown in FIG. 2A, the threat countermeasure system 1 according to an embodiment includes a countermeasure device 5, a blocking device 6, and a decision device 50. The countermeasure device 5 detects the incoming threats 4A and 4B, and counters, with the laser irradiation, the threat 4A that flies along a path 70A passing over the blocking device 6. The blocking device 6 is installed at a position where the threats 4A and 4B are prevented from passing through a block region 20 in which the lethality of the laser irradiation is presumed to be lower than the predetermined threshold value and approaching a protection target 3. For example, the passage of the threat 4B flying along a path 70B below an upper end of the blocking device 6 is blocked. The threat 4A bypasses the blocking device 6 to move, and as a result, passes through a space on an outer side of the block region 20 and on an inner side of a striking range of the countermeasure device 5. The decision device 50 decides a position of the upper end of the blocking device 6 based on an upper end of the block region 20. Here, a case will be described, as an example, in which since an area of the block region 20 projected onto a ground 2 is relatively large, a length of the blocking device 6 projected onto the ground 2 is relatively long with respect to a height of the blocking device 6 in a direction orthogonal to an incoming direction of the threat 4B, and thus the threat 4B is presumed to pass over the blocking device 6 from above in order to bypass the blocking device 6. Hereinafter, in a case where the threats 4A and 4B are not distinguished, these are collectively referred to as a threat 4.

Figure 2B:
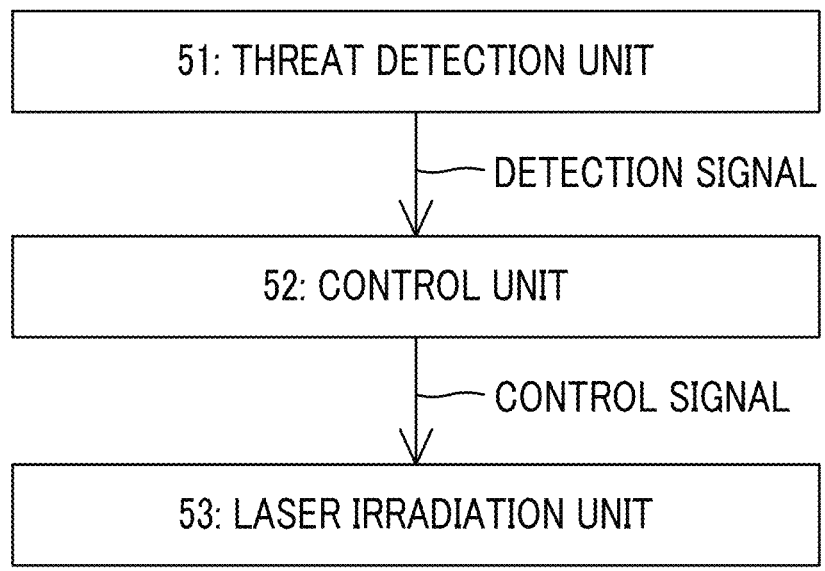
FIG. 2B is a diagram showing a configuration example of a countermeasure device according to an embodiment.

As shown in FIG. 2B, the countermeasure device 5 according to an embodiment includes a threat detection unit 51, a control unit 52, and a laser irradiation unit 53. The threat detection unit 51 detects the threat 4 and generates and outputs a detection signal representing a position of the threat 4. The control unit 52 controls the laser irradiation unit 53 based on the detection signal. The laser irradiation unit 53 counters the threat 4 with the laser irradiation under the control of the control unit 52.

Figure 2C:
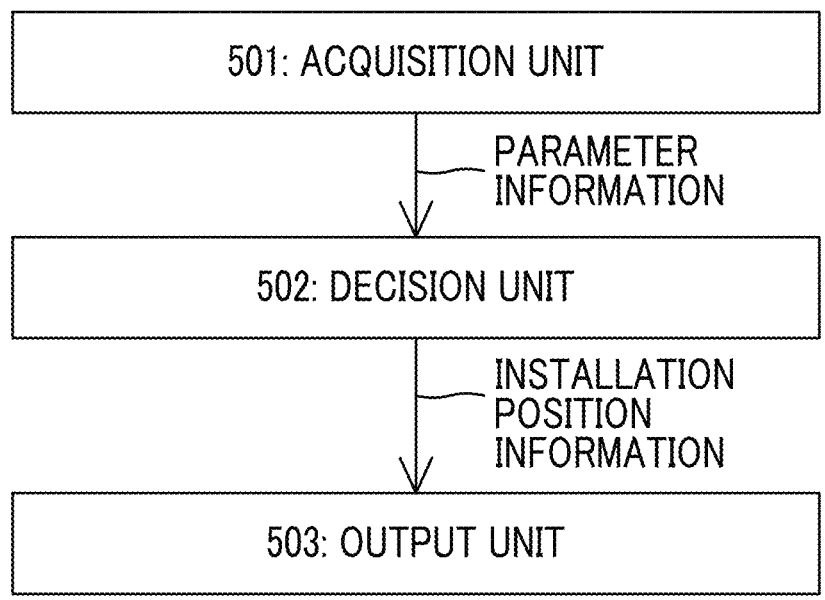
FIG. 2C is a diagram showing a configuration example of a decision device according to an embodiment.

As shown in FIG. 2C, the decision device 50 according to an embodiment includes an acquisition unit 501, a decision unit 502, and an output unit 503. The decision device 50 may be configured as, for example, a so-called computer that realizes a desired process by a calculation device executing a program. The acquisition unit 501 acquires a parameter group related to an environment around the countermeasure device 5, and transmits parameter information representing the acquired parameter group to the decision unit 502. The decision unit 502 decides a position where the blocking device 6 is installed, based on this parameter group. In the output unit 503, installation position information representing the installation position of the blocking device 6 is output so as to be transmitted to a worker who installs the blocking device 6. The decision device 50 may be separated from the countermeasure device 5 as in the example of FIG. 2A, or may be integrated into the countermeasure device 5.

A configuration example of the threat countermeasure method according to an embodiment will be described with reference to a flowchart of FIG. 3. In other words, an operation example of the threat countermeasure system 1 according to an embodiment will be described with reference to the flowchart of FIG. 3.

Figure 3:
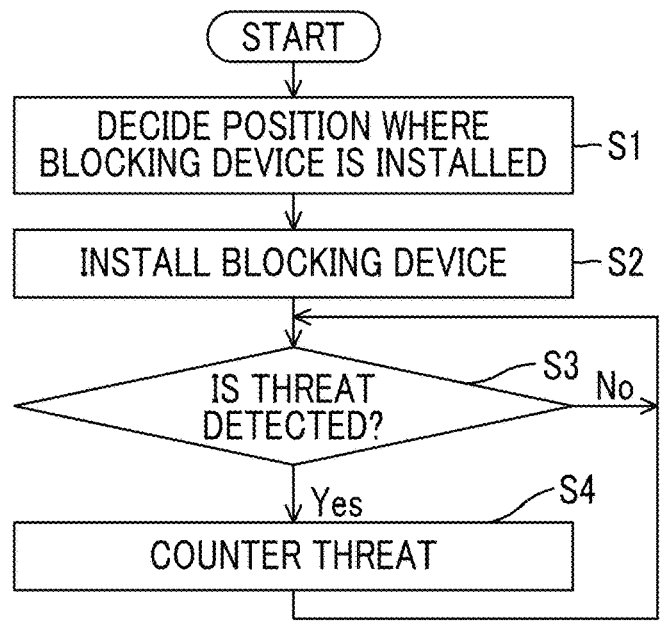
FIG. 3 is a flowchart showing a configuration example of a threat countermeasure method according to an embodiment.

In a case where a process of the flowchart of FIG. 3 is started, step S1 is executed. In step S1, the decision device 50 decides the position where the blocking device 6 is installed.

First, the acquisition unit 501 of the decision device 50 acquires the parameter group related to the environment around the countermeasure device 5. This parameter group includes, for example, the refractive index structure constant $Cn^2$ indicating the degree of atmospheric fluctuation in the striking range space in which the laser beam emitted by the countermeasure device 5 propagates up to the threat 4. For example, the acquisition unit 501 may include a measurement device group that measures this parameter group, or may include a communication device that receives, from the outside, a signal representing the parameter group measured by an external measurement device group. The acquisition unit 501 transmits the parameter information representing the acquired parameter group to the decision unit 502.

Next, the decision unit 502 of the decision device 50 specifies a position and a range of the block region 20 in which the blocking device 6 blocks the region passage of the threat 4, based on the parameter group represented by the received parameter information. The block region 20 may be decided, for example, as a region where the refractive index structure constant $Cn^2$ of the atmosphere in the region is presumed to be larger than a predetermined threshold value, that is, may be a region where the lethality of the laser beam is presumed to be lower than the predetermined threshold value for a reason such as insufficient focusing of the emitted laser beam due to the influence of atmospheric fluctuation, or may include this region. In a case where the block region 20 is decided, it may be considered that the refractive index structure constant $Cn^2$ changes with time, a weather condition, or the like. For example, the block region 20 may be decided in consideration of a time, weather condition, or the like at which the refractive index structure constant $Cn^2$ is maximized, or may be decided in consideration of an appearance probability of the refractive index structure constant $Cn^2$ based on statistics or a simulation. The decision unit 502 further decides the position where the blocking device 6 is installed, based on the upper end of the block region 20. The position of the blocking device 6 includes the position of the upper end of the blocking device 6. An altitude of the position of the upper end of the blocking device 6 may be, for example, the same altitude as the upper end of the block region 20, or an altitude higher than the upper end of the block region 20 by a predetermined distance. A lower end of the blocking device 6 may be in contact with the ground 2, or may be separated from the ground 2 to such an extent as to block the passage of the threat 4 under the blocking device 6. The position of the blocking device 6 may be decided in consideration of a distance from the laser irradiation unit 53 to the threat 4. In a case where the distance from the laser irradiation unit 53 to the threat 4 is short even though the refractive index structure constant $Cn^2$ is large, the lethality of the laser beam sufficient to counter the threat 4 may be maintained and thus it may not be necessary to block the threat 4 with the blocking device 6.

Next, in the output unit 503 of the decision device 50, the installation position information representing the installation position of the blocking device 6 is output so as to be transmitted to the worker who installs the blocking device 6. For example, the output unit 503 may include a display device and display the installation position information on the display device, or may include a communication device and transmit the installation position information to a communication terminal owned by the worker.

Step S2 is executed after step S1. In step S2, the worker installs the blocking device 6 at the position decided in step S1. The blocking device 6 is configured to block the passage of the threat 4 through the block region 20. As an example, in a case where the threat 4 is a drone, the blocking device 6 may be a net installed in the air. It is preferable that a mesh of the net is sufficiently narrow such that the drone as the threat 4 cannot pass through. Further, the net may be made of a material having a sufficiently high transmittance to the laser beam in order to suppress damage caused by the laser irradiation of the countermeasure device 5. The blocking device 6 may include a column or the like for installing the net in the air.

Step S3 is executed after step S2. In step S3, the threat detection unit 51 of the countermeasure device 5 determines whether or not the threat 4 is detected. After that, the threat detection unit 51 transmits the detection signal representing a determination result to the control unit 52. In a case where the threat detection unit 51 detects the threat 4 (Yes), the detection signal includes threat position information representing the position of the threat 4, and the process proceeds to step S4. On the contrary, in a case where the threat detection unit 51 does not detect the threat 4 (No), the process repeats step S3. In other words, step S3 is repeated until the threat detection unit 51 detects the threat 4.

Figure 4:
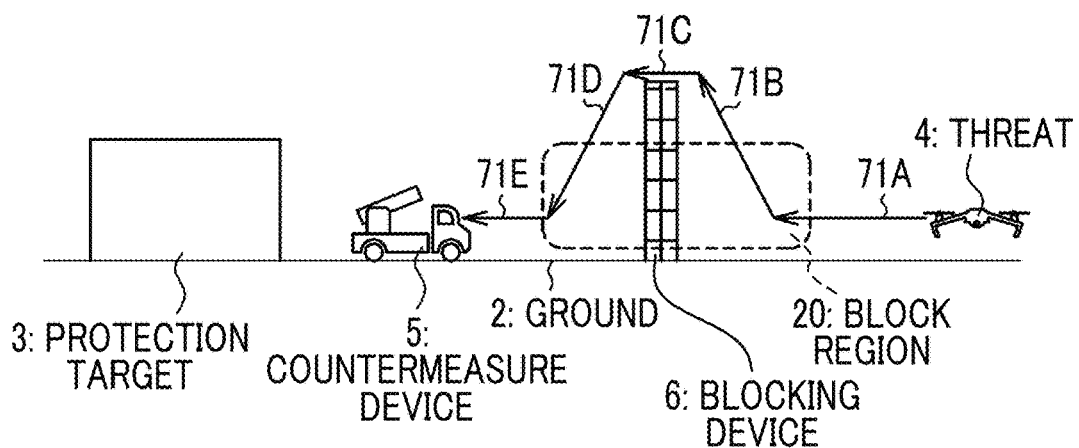
FIG. 4 is a diagram showing an operation example of the threat countermeasure system according to an embodiment.

As shown in FIG. 4, the threat 4 that comes flying to approach the protection target 3 initially moves along a path 71A having a relatively low altitude. The reason is that in a case where the threat 4 flies in a place where the altitude is low, as compared with a place where the altitude is high, a radar or the like is difficult to detect the threat 4. Further, the reason is that the laser beam is difficult to be focused in a place close to the ground 2, as compared with a place far from the ground 2, due to a high degree of atmospheric fluctuation, that is, it is difficult to increase the lethality of the laser irradiation, and as a result, it is difficult to counter the threat 4 with the laser irradiation.

However, it is presumed that the threat 4 that initially comes flying along the path 71A having a relatively low altitude increases the altitude along a path 71B to bypass the blocking device 6. Further, it is presumed that the threat 4 subsequently passes over the blocking device 6 along a path 71C, lowers the altitude along a path 71D, and attempts to approach the protection target 3 along a path 71E having a relatively low altitude. As described above, with the threat countermeasure method according to an embodiment, due to the installation of the blocking device 6 at an appropriate position, the altitude of the threat 4 is caused to be raised above the upper end of the blocking device 6, and thus it is possible to guide the threat 4 to a region, including the path 71C, where the degree of atmospheric fluctuation is low.

In step S4 of the flowchart of FIG. 3, the laser irradiation unit 53 of the countermeasure device 5 emits the laser beam to counter the threat 4. First, the control unit 52 transmits a control signal including the threat position information to the laser irradiation unit 53. Next, the laser irradiation unit 53 emits the laser beam to the threat 4 in accordance with the control signal. In this case, the laser irradiation unit 53 may automatically perform, according to the control signal, an operation of directing an optical axis direction of the emitted laser beam toward the threat 4 and an operation of focusing the laser beam at the position of the threat 4. Further, an operation of actually emitting the laser beam by the laser irradiation unit 53 may be performed under the control of the worker.

As shown in FIG. 4, in a case where the threat 4 flies along the path 71C, the threat 4 is on the outer side of the block region 20 in which the degree of atmospheric fluctuation is relatively high. Therefore, the laser irradiation unit 53 can counter and neutralize the threat 4 with the laser irradiation having the lethality higher than the predetermined threshold value, which is obtained by focusing the laser beam with sufficient accuracy.

In addition, in a case where the threat 4 flies along the paths 71D and 71E, even in a case where the threat 4 is in the block region 20, the distance from the laser irradiation unit 53 to the threat 4 is relatively short. Therefore, the laser irradiation unit 53 can counter the threat 4 with the laser irradiation having a sufficiently high lethality. In this case, a part of the laser beam may be emitted to the blocking device 6. However, in a case where a transmittance of a material constituting the blocking device 6 to the laser beam is sufficiently high, damage to the blocking device 6 due to the laser irradiation is suppressed. In this case, in step S1 of the flowchart of FIG. 3, the installation position of the blocking device 6 may be decided, further based on a distance from the countermeasure device 5, such that the lethality of the laser beam emitted by the laser irradiation unit 53 of the countermeasure device 5 is larger than the predetermined threshold value on an inner side of the block region 20. This threshold value is, for example, the lethality that the laser beam is presumed to neutralize the threat 4 on the inner side of the block region 20. In other words, a position in the block region 20 where the lethality of the laser beam exceeds the threshold value may be set as a limit of a relative distance from the countermeasure device 5 to the blocking device 6.

Further, in a case where the threat 4 flies along the paths 71A and 71B, the laser irradiation unit 53 may counter the threat 4 with the laser irradiation. In this case, the threat 4 is in the block region 20, the distance from the laser irradiation unit 53 to the threat 4 is relatively long, and the blocking device 6 is installed between the laser irradiation unit 53 and the threat 4. Thus, the lethality of the laser irradiation may be low as compared with a case where the case where the threat 4 flies along the paths 71C, 71D, and 71E. Nevertheless, the longer the threat 4 flies to approach the protection target 3, the more damage to the threat 4 caused by the laser irradiation accumulates.

After step S4 of the flowchart of FIG. 3, the process returns to step S3 in order to detect and counter another threat 4.

As described above, the threat countermeasure system 1 and the threat countermeasure method according to an embodiment can efficiently counter the incoming threat 4 with the laser irradiation.

Modification Example, Part 1

In the above-described first embodiment, the configuration has been described in which the blocking device 6 is installed so as to block the passing of the threat 4 through the block region 20. As a modification example of this configuration, with reference to the examples of FIGS. 5A and 5B, a configuration will be described in which the blocking device 6 is installed in order to counter the threat 4 flying in a space hidden behind an obstacle as viewed from the countermeasure device 5. In this case, the block region 20 includes, for example, a space included in a blind spot behind the obstacle as viewed from the countermeasure device 5.

Figure 5A:
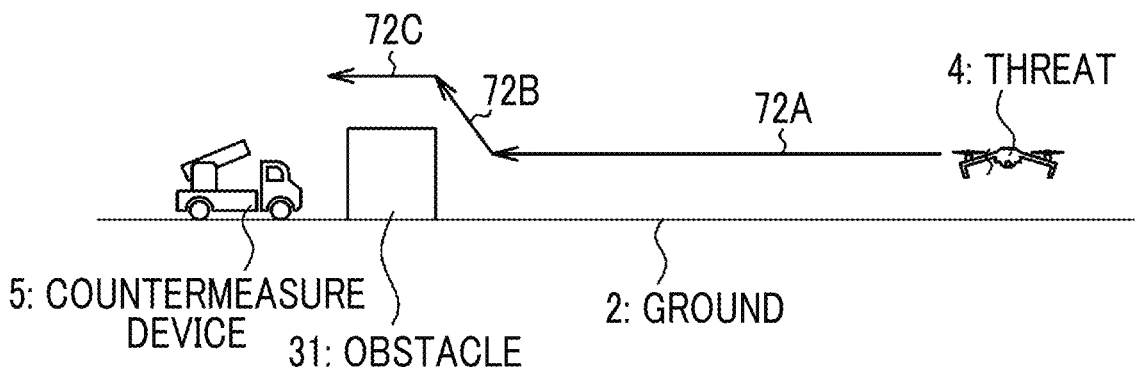
FIG. 5A is a diagram for describing a modification example of the threat countermeasure system according to an embodiment.

As shown in the example of FIG. 5A, in a case where an obstacle 31 is present between the countermeasure device 5 and the threat 4, it is difficult for the countermeasure device 5 to counter the threat 4 with the laser irradiation. In the example of FIG. 5A, the threat 4 flies along a path 72A having a relatively low altitude, increases the altitude along a path 72B to bypass the obstacle 31, and passes over the obstacle 31 along a path 72C. The threat 4 is in the blind spot of the obstacle 31 as viewed from the countermeasure device 5 while the threat 4 flies along the paths 72A and 72B. Thus, it is difficult for the countermeasure device 5 to counter the threat 4 with the laser irradiation. In other words, even though the countermeasure device 5 attempts to counter the threat 4 in the blind spot of the obstacle 31 with the laser irradiation, the lethality of the laser irradiation against the threat 4 is insufficient or zero. On the other hand, the countermeasure device 5 can counter the threat 4 with the laser irradiation in a case where the threat 4 passes over the obstacle 31. However, in this case, since the distance from the countermeasure device 5 to the threat 4 is relatively short, the countering against the threat 4 may not always be in time.

Figure 5B:
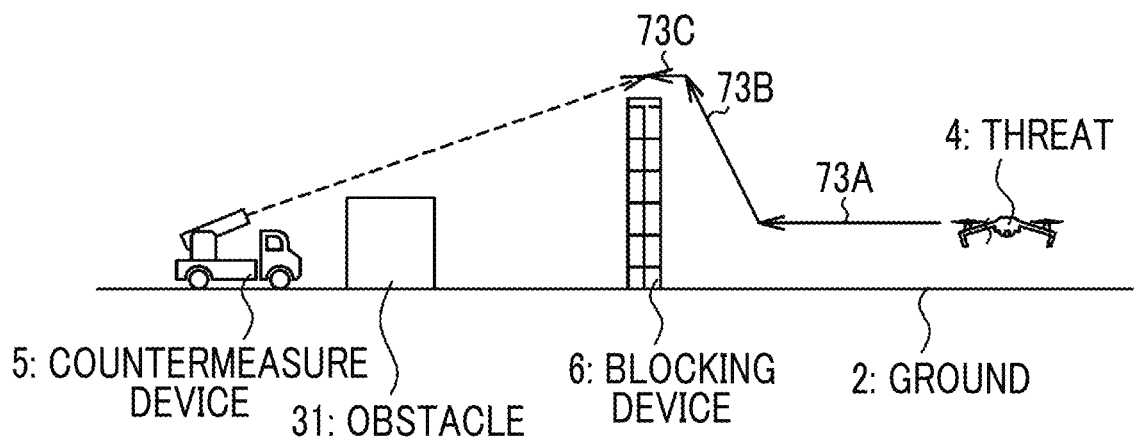
FIG. 5B is a diagram for describing a modification example of the threat countermeasure system according to an embodiment.

In the present modification example, as shown in the example of FIG. 5B, the blocking device 6 is installed between the obstacle 31 and the threat 4. With the installation therebetween, the threat 4 flies along a path 73A having a relatively low altitude, increases the altitude along a path 73B to bypass the blocking device 6, and passes over the blocking device 6 along a path 73C. In this case, the threat 4 flying along the path 73C is not in the blind spot of the obstacle 31 as viewed from the countermeasure device 5, and the distance from the countermeasure device 5 to the threat 4 is relatively long. Therefore, the countering against the threat 4 is in time. In other words, in the present modification example, the position of the blocking device 6 is decided such that the countermeasure device 5 can counter, in a case where the threat 4 passes over the blocking device 6, the threat 4 with the laser irradiation having the lethality passing over a predetermined height, and the blocking device 6 is installed.

Modification Example, Part 2

In the above modification example, the configuration has been described in which the obstacle 31 is present between the countermeasure device 5 and the threat 4. As another modification example of the first embodiment, which is different from the above modification example, in a case where an obstacle 32 is present in a space behind the threat 4 as viewed from the countermeasure device 5, a configuration will be described in which the blocking device 6 is installed in order for the countermeasure device 5 to counter the threat 4, with reference to the examples of FIGS. 6A and 6B.

Figure 6A:
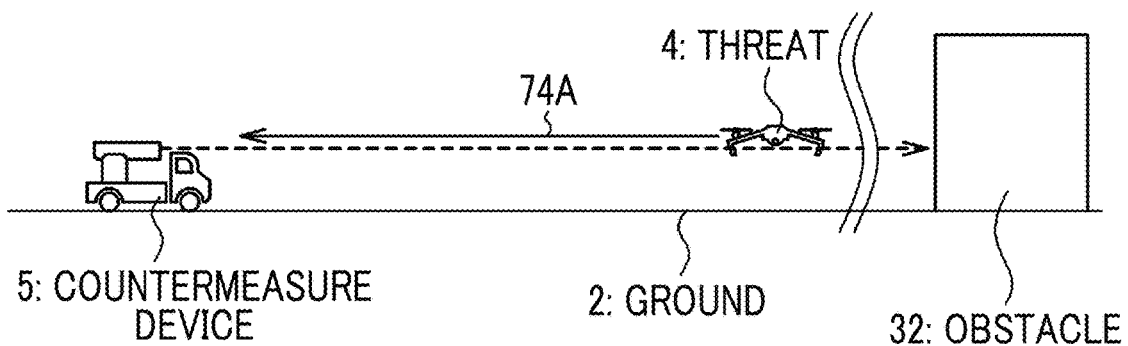
FIG. 6A is a diagram for describing a modification example of the threat countermeasure system according to an embodiment.

As shown in the example of FIG. 6A, in a case where the obstacle 32 is present in the space behind the threat 4 as viewed from the countermeasure device 5 and it is not preferable to emit the laser beam to the obstacle 32, it is difficult for the countermeasure device 5 to counter the threat 4 with the laser irradiation. In a case where the threat 4 moves toward the countermeasure device 5 along a path 74A between the obstacle 32 and the countermeasure device 5, a possibility that the laser beam is emitted to the obstacle 32 remains high in a case where the countermeasure device 5 attempts to counter the threat 4 with the laser irradiation. In other words, as long as the threat 4 is present between the countermeasure device 5 and the obstacle 32, that is, as long as the countermeasure device 5 avoids the laser irradiation to the threat 4 so as not to emit the laser beam to the obstacle 32, the lethality of the laser irradiation by the countermeasure device 5 against the threat 4 is zero.

Figure 6B:
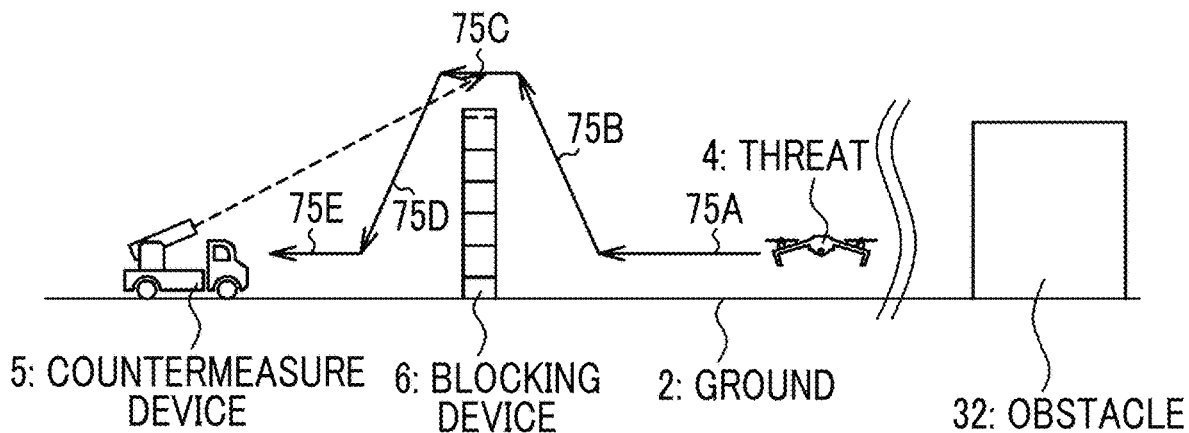
FIG. 6B is a diagram for describing a modification example of the threat countermeasure system according to an embodiment.

In the present modification example, as shown in the example of FIG. 6B, the blocking device 6 is installed between the countermeasure device 5 and the threat 4. With the installation therebetween, the threat 4 flies along a path 75A having a relatively low altitude, increases the altitude along a path 75B to bypass the blocking device 6, and passes over blocking device 6 along a path 75C. After that, the threat 4 lowers the altitude along a path 75D to approach the countermeasure device 5 along a path 75E having a relatively low altitude. In this case, there is no obstacle 32 in the space behind the threat 4 flying along the path 75C as viewed from the countermeasure device 5. Therefore, the countermeasure device 5 can counter the threat 4 with the laser irradiation without emitting the laser beam to the obstacle 32. In other words, in the present modification example, the position of the blocking device 6 is decided such that the countermeasure device 5 can counter, in a case where the threat 4 passes over the blocking device 6, the threat 4 with the laser irradiation having the lethality passing over a predetermined height, and the blocking device 6 is installed.

Modification Example, Part 3

In the above embodiment, the configuration has been described in which the installation position of the blocking device 6 is decided on the premise that the area of the block region 20 projected onto the ground 2 is relatively large, the length of the blocking device 6 projected onto the ground 2 is relatively long, and thus the threat 4 passes over the blocking device 6 from above to bypass the blocking device 6. As a modification example of this configuration, a configuration will be described in which the installation position of the blocking device 6 is decided on the premise that the threat 4 may bypass the blocking device 6 from a side, with reference to the example of FIG. 7.

Figure 7:
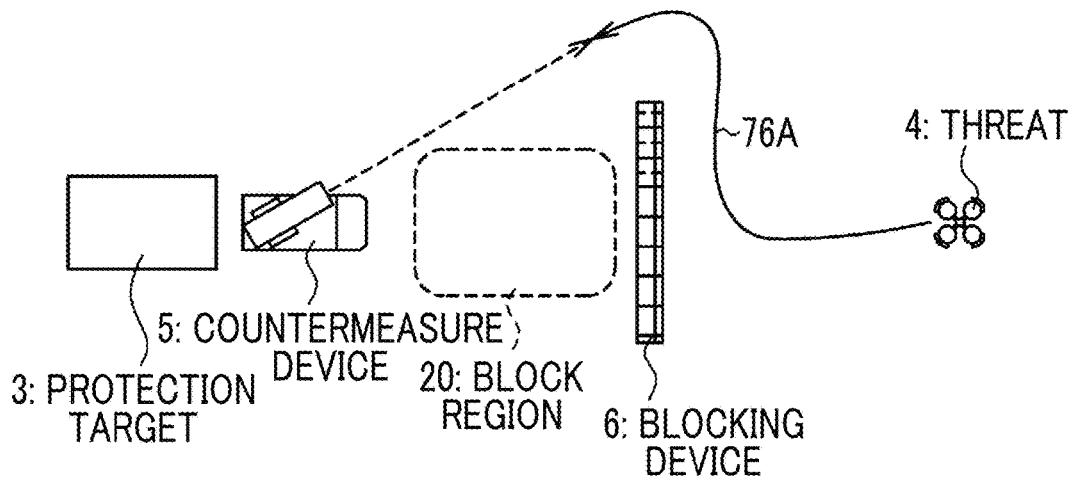
FIG. 7 is a diagram showing a modification example of the threat countermeasure system according to the embodiment.

As shown in the example of FIG. 7, in a case where the scale of the block region 20 that is present between the protection target 3 and the threat 4 is relatively small and the area of the block region 20 projected onto the ground 2 is relatively narrow, the length of the blocking device 6 projected onto the ground 2 can be relatively short. In other words, it is possible to suppress costs of installing and maintaining the blocking device 6 according to the scale of the block region 20.

However, in such a case, the incoming threat 4 bypasses the blocking device 6 from the side more easily, as compared with the case where the length of the blocking device 6 projected onto the ground 2 is relatively long, in order for the incoming threat 4 to bypass the blocking device 6. In this case, as shown in the example of FIG. 7, in a case where the countermeasure device 5 counters, with the laser irradiation, the threat 4 bypassing the blocking device 6 from the side along a path 76A, a position of a lateral end portion of the blocking device 6 is decided such that the laser beam does not pass through the block region 20, and the blocking device 6 is installed.

Modification Example, Part 4

In the above-described embodiment and modification example, the configuration has been described in which the blocking device 6 is the net made of the material having the relatively high transmittance to the laser beam. As a modification example of this configuration, a case will be described where another configuration is used as the blocking device 6.

As an example, a plate-shaped object having a relatively high transmittance to the laser beam may be installed on the ground 2 so as to block the passage of the threat 4, and may be used as the blocking device 6. In this case, one or more columns may be used to support the plate-shaped object. Similarly, a plurality of columnar objects having a relatively high transmittance to the laser beam may be installed on the ground 2 at spacings so as to block the passage of the threat 4, and may be used as the blocking device 6.

As another example, a net, a plate-shaped object, or a columnar object made of a material that is relatively less damaged even in a case of being emitted by the laser beam is installed on the ground 2 so as to block the passage of the threat 4, and may be used as the blocking device 6. As a specific example, a barbed iron wire may be used as the blocking device 6. Further, a net, a plate-shaped object, or a columnar object made of a flame-retardant material that is hard to burn even in a case of being emitted by the laser beam is installed on the ground 2 so as to block the passage of the threat 4, and may be used as the blocking device 6. The flame-retardant material includes, for example, vinyl chloride.

As yet another example, the blocking device 6 that blocks the passage of the threat 4 by continuing to move may be used. Specifically, an air curtain generator, a fan, or the like may be installed as the blocking device 6 so as to block the flight of the threat 4 by causing a wind. Further, as another specific example, a shutter, a fan, or the like that partially obstructs a range in which the passage of the threat 4 is desired to be blocked may be used as the blocking device 6. In this case, the shutter or the fan moves so as to obstruct, in a time division, the entire range in which the passage of the threat 4 is desired to be blocked. Further, a moving speed of a blade of the shutter or the fan is set, according to a flight speed of the threat 4, such that the blade of the shutter or the fan arrives, before the threat 4 passes through a range in which the blade of the shutter or the fan is not present, at the range to block the passage of the threat 4.

Second Embodiment

In the above embodiment, the blocking device 6 is installed so as to be fixed to the ground 2. In the present embodiment, a configuration will be described in which a part or the whole of the blocking device 6 is installed in a state of being suspended from the sky, with reference to the examples of FIGS. 8 and 9.

Figure 8:
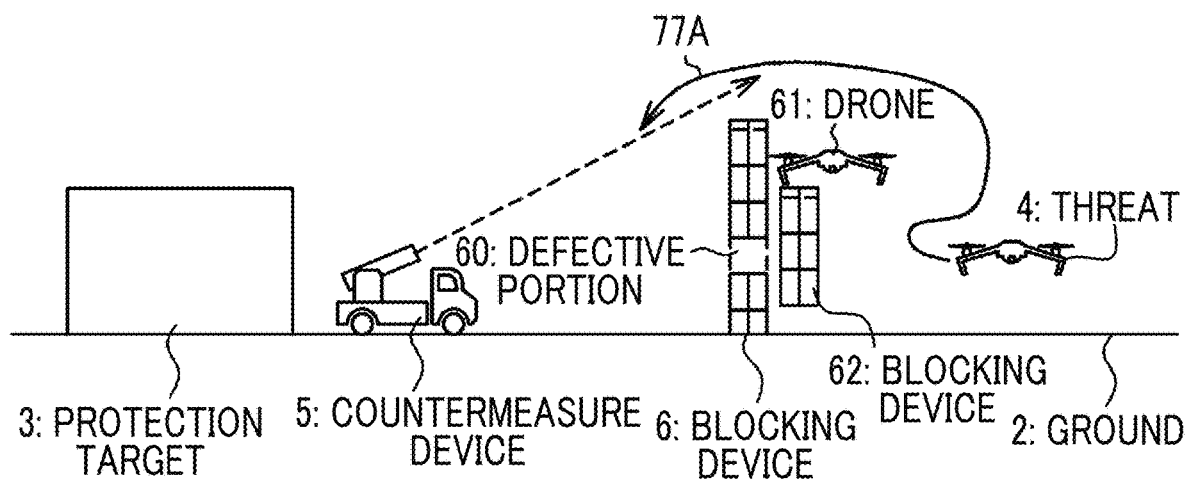
FIG. 8 is a diagram showing a configuration example of the threat countermeasure system according to an embodiment.

The threat countermeasure system 1 according to the present embodiment shown in the example of FIG. 8 is obtained by adding the following changes to the threat countermeasure system 1 according to the first embodiment shown in FIG. 2A. That is, the blocking device 6 includes a defective portion 60, and the threat countermeasure system 1 further includes another blocking device 62 that closes the defective portion 60 and a drone 61 that supports the blocking device 62 in a suspended state from the sky. The number of drones 61 may be plural.

In the present embodiment, in a case where the scale of the defective portion 60 of the blocking device 6 is large enough to allow the threat 4 to pass on an inner side of the defective portion 60, the blocking device 62 different from the blocking device 6 is further installed to block the passage of the threat 4 through the defective portion 60 to approach the protection target 3. The blocking device 62 may be suspended, near the defective portion 60, by the drone 61 that stands by in a hovering state.

As an example, the presence and position of the defective portion 60 of the blocking device 6 is detected by the acquisition unit 501 of the decision device 50. In this case, the decision unit 502 of the decision device 50 may decide to close the defective portion 60 with the blocking device 62, and the output unit 503 of the decision device 50 may control the drone 61 in a state where the blocking device 62 is suspended to guide the drone 61 to the position of the defective portion 60.

Also in the example of FIG. 8, the threat 4 cannot pass through the defective portion 60 of the blocking device 6, and thus the threat 4 passes over the blocking device 6 from above along a path 77A. In this case, the countermeasure device 5 can counter the threat 4 with the laser irradiation.

As described above, in the threat countermeasure system 1 according to the present embodiment, with the closing of the defective portion 60 by another blocking device 62 in a case where the blocking device 6 is partially damaged, it is possible to block the passage of the threat 4 through the defective portion 60 without replacing or repairing the blocking device 6.

Figure 9:
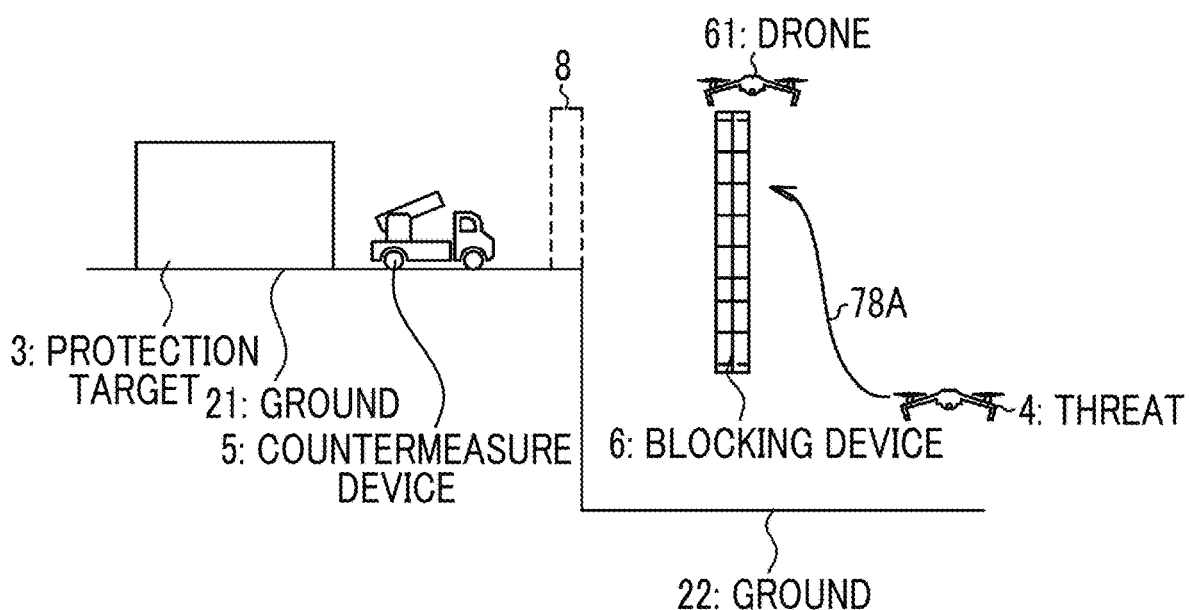
FIG. 9 is a diagram showing a configuration example of the threat countermeasure system according to an embodiment.

In the threat countermeasure system 1 according to the present embodiment shown in the example of FIG. 9, the entire blocking device 6 is installed in the air by the drone 61. The number of drones 61 may be plural. As in the example of FIG. 9, such a configuration is effective in a case, or the like, where the protection target 3 and the countermeasure device 5 are located on a ground 21 on a cliff and the threat 4 flies at a relatively low altitude along a path 78A from a ground 22 under the cliff. In particular, a range 8 is too close to the countermeasure device 5 to install the blocking device 6 on the ground 21, and there may be no sufficient time for the countermeasure device 5 to counter the threat 4 after the threat 4 reaches the sky above the ground 21. Further, in a case where the blocking device 6 is installed on the ground 22, a dimension of the blocking device 6 in a height direction may not reach a desired height. Even in such a case, it is possible to install the entire blocking device 6 in the air such that the upper end of the blocking device 6 reaches a desired altitude.

Furthermore, with the installation of the entire blocking device 6 in the air using the drone 61, it is possible to install the blocking device 6 above a water surface such as at sea.

As described above, in the threat countermeasure system 1 and the threat countermeasure method according to the present embodiment, it is possible to install the blocking device 6 not only on a flat ground but also on various terrains.

Third Embodiment

In the above-described embodiment, the configuration has been described in which the threat detection unit 51 of the countermeasure device 5 detects the incoming threat 4. In the present embodiment, a configuration will be described in which the countermeasure device 5 starts the countering against the threat 4 more quickly by detection of the threat 4 using a remote sensor installed at a position away from the countermeasure device 5, with reference to FIGS. 10 and 11.

Figure 10:
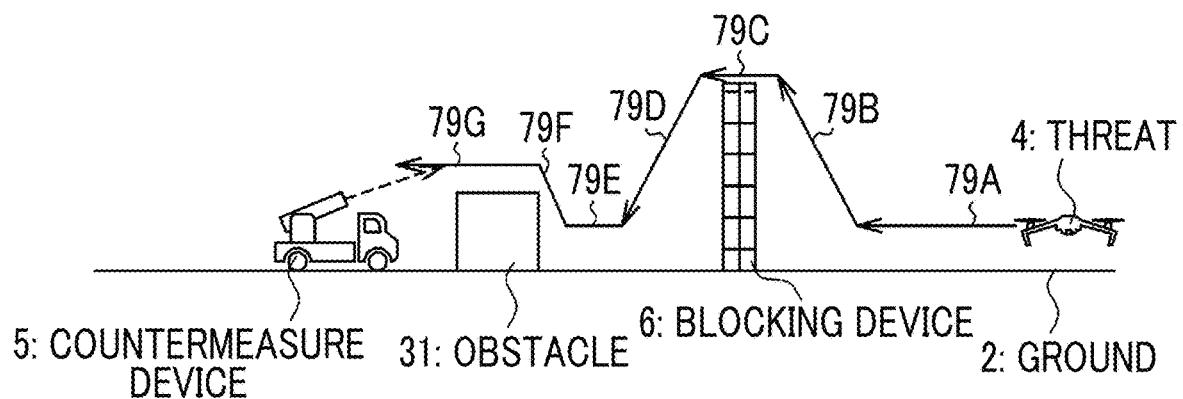
FIG. 10 is a diagram showing a configuration example of the threat countermeasure system according to an embodiment.

The threat countermeasure system 1 according to the present embodiment shown in the example of FIG. 10 is obtained by adding the obstacle 31 to the threat countermeasure system 1 shown in FIG. 2A. As in the case of the modification example of the first embodiment shown in FIGS. 5A and 5B, the obstacle 31 hinders the detection of the threat 4 in the blind spot of the obstacle 31 as viewed from the countermeasure device 5 by the threat detection unit 51 of the countermeasure device 5. In this case, the threat 4 flies along a path 79A having a relatively low altitude from the ground 2, increases the altitude along a path 79B to bypass the blocking device 6, and passes over the blocking device 6 along a path 79C. In this case, the threat 4 is in the blind spot of the obstacle 31 as viewed from the countermeasure device 5, and thus the countermeasure device 5 may not yet be able to counter the threat 4. After that, the threat 4 lowers the altitude along a path 79D, flies along a path 79E having a relatively low altitude from the ground 2, increases the altitude along a path 79F to bypass the obstacle 31, and passes over the obstacle 31 along a path 79G. Even though the threat detection unit 51 of the countermeasure device 5 detects the threat 4 for the first time at this moment, the countering against the threat 4 with the laser irradiation by the laser irradiation unit 53 of the countermeasure device 5 may not always be in time.

Figure 11:
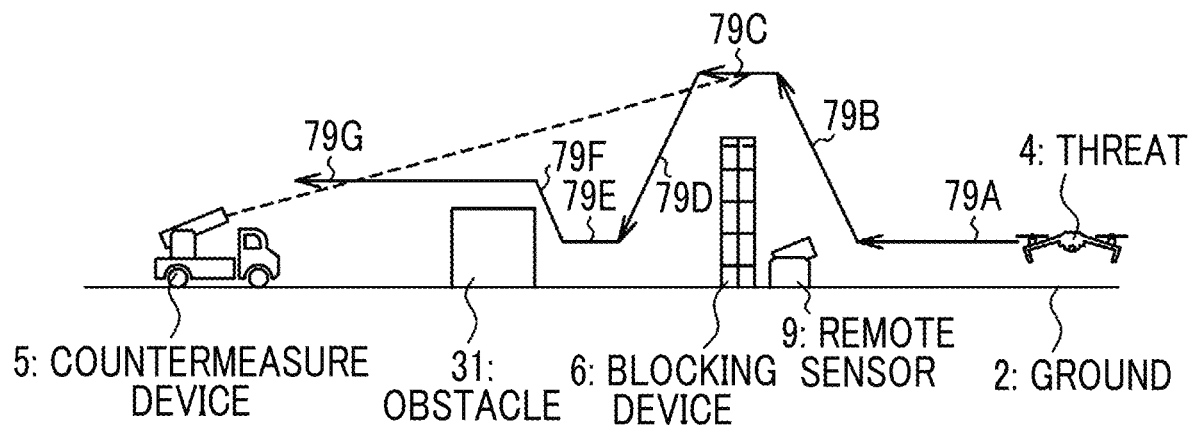
FIG. 11 is a diagram showing a configuration example of the threat countermeasure system according to an embodiment.

In the present embodiment, as shown in the example of FIG. 11, a remote sensor 9 detecting the threat 4 is installed in a place where the threat 4 that comes flying from a space hidden behind the blocking device 6 does not enter the blind spot of the obstacle 31, as viewed from the countermeasure device 5. The remote sensor 9 may be further installed at a place closer to the blocking device 6 than the countermeasure device 5. In a case where the threat 4 is detected, the remote sensor 9 transmits a remote detection signal representing the position of the threat 4 to the threat detection unit 51 of the countermeasure device 5. The threat detection unit 51 includes a communication device that receives the remote detection signal, and transmits the position of the threat 4 represented by the remote detection signal to the control unit 52. In this manner, before the threat 4 approaches too close to the countermeasure device 5, for example, at a point in time at which the threat 4 passes over the blocking device 6 along the path 79C, the countermeasure device 5 can counter the threat 4 with the laser irradiation.

As described above, in the threat countermeasure system 1 and the threat countermeasure method according to the present embodiment, with the provision of the remote sensor 9 that detects the threat 4 from a position away from the countermeasure device 5, it is possible to detect the presence of the threat 4 in a place difficult to be detected by the threat detection unit 51 of the countermeasure device 5 more quickly and to counter the threat 4 more efficiently. In this case, the block region 20 includes, for example, a space included in the blind spot behind the obstacle 31 as viewed from the countermeasure device 5.

The invention made by the inventors has been specifically described above based on the embodiments, but the present invention is not limited to the embodiments. It goes without saying that various changes can be made without departing from the gist of the present invention. Further, the respective features described in the embodiments can be freely combined within a technically consistent range. For example, in the first embodiment, the remote sensor 9 used in the third embodiment may be introduced. A case where the threat detection capability of a threat countermeasure system is lowered due to the influence of the blocking device 6 or a case where the threat detection at a long distance is insufficient can be compensated for.

The threat countermeasure system 1 and the threat countermeasure method described in each embodiment are grasped as follows, for example.

(1) A threat countermeasure system 1 according to a first aspect includes a countermeasure device 5, a blocking device 6, and a decision device 50. The countermeasure device 5 detects an incoming threat 4 and counters the threat 4 with laser irradiation. The blocking device 6 is installed so as to block the approach of the threat 4 to a protection target 3 through a block region 20 in which lethality of the laser irradiation is presumed to be lower than a predetermined threshold value. The decision device 50 decides a position of an upper end of the blocking device 6 based on an upper end of the block region 20.

In the threat countermeasure system 1 according to the first aspect, an effect is achieved that it is possible to guide the threat 4 to the outer side of the block region 20 with the blocking device 6 to counter the threat 4 with the laser irradiation.

(2) The threat countermeasure system 1 according to a second aspect is the threat countermeasure system 1 according to the first aspect, in which the block region 20 includes a space in which a refractive index structure constant $Cn^2$ is larger than a predetermined threshold value.

In the threat countermeasure system 1 according to the second aspect, with the guiding of the threat 4 to the outer side of the block region 20 where the lethality of laser irradiation is reduced due to a large degree of atmospheric fluctuation, an effect is achieved that it is possible to counter the threat 4 with the laser irradiation in a space in which the lethality of laser irradiation is sufficiently high.

(3) The threat countermeasure system 1 according to a third aspect is the threat countermeasure system 1 according to the first aspect, in which the block region 20 includes a space which is included in a blind spot as viewed from the countermeasure device 5.

In the threat countermeasure system 1 according to the third aspect, an effect is achieved that, with the guiding of the threat 4 to the outer side of the block region 20 included in the blind spot as viewed from the countermeasure device 5, it is possible to counter the threat 4 with the laser irradiation.

(4) The threat countermeasure system 1 according to a fourth aspect is the threat countermeasure system 1 according to the first aspect, in which the block region 20 is in front of an obstacle 32 as viewed from the countermeasure device 5.

In the threat countermeasure system 1 according to the fourth aspect, with the guiding of the threat 4 to the outer side of the block region 20 between the countermeasure device 5 and the obstacle 32 to which the laser beam is not preferable to be emitted, an effect is achieved that it is possible to counter the threat 4 with the laser irradiation.

(5) The threat countermeasure system 1 according to a fifth aspect is the threat countermeasure system 1 according to the first to fourth aspects, and further includes a drone 61 that suspends and supports the blocking device 6.

In the threat countermeasure system 1 according to the fifth aspect, with the suspending and supporting of the blocking device 6 using the drone 61, an effect is achieved that it is possible to install the blocking device 6 not only on a flat ground but also on various terrains.

(6) The threat countermeasure system 1 according to a sixth aspect is the threat countermeasure system 1 according to the first to fourth aspects, and further includes another blocking device 62 and a drone 61. The other blocking device 62 is installed to compensate for a defective portion 60 of the blocking device 6. The drone 61 suspends and supports the other blocking device 62.

In the threat countermeasure system 1 according to the sixth aspect, with the compensation for the defective portion 60 of the blocking device 6 with the other blocking device 62 suspended by the drone 61, an effect is achieved that it is possible to block the passage of the threat 4 through the defective portion 60 without replacing or repairing the blocking device 6.

(7) The threat countermeasure system 1 according to a seventh aspect is the threat countermeasure system 1 according to the first to sixth aspects, in which the countermeasure device 5 includes a threat detection unit 51, a laser irradiation unit 53, and a control unit 52. The threat detection unit 51 detects the threat 4 and outputs a detection signal representing a position of the threat 4. The laser irradiation unit 53 counters the threat 4 with the laser irradiation. The control unit 52 controls the laser irradiation unit 53 based on the detection signal.

In the threat countermeasure system 1 according to the seventh aspect, with the emitting of the laser beam to the detected position of the threat 4, an effect is achieved that it is possible to counter the threat 4.

(8) The threat countermeasure system 1 according to an eighth aspect is the threat countermeasure system 1 according to the seventh aspect, and further includes a remote sensor 9. The remote sensor 9 is installed away from the countermeasure device 5, detects the threat 4, and outputs a remote detection signal representing a position of the threat 4. The control unit 52 controls the laser irradiation unit 53 further based on the remote detection signal.

In the threat countermeasure system 1 according to the eighth aspect, with the detection of the threat 4 at a position where the countermeasure device 5 cannot detect using the remote sensor 9 and the transmission of the position of the threat 4 by the remote sensor 9 to the control unit 52, an effect is achieved that the countermeasure device 5 can counter the threat 4 more efficiently.

(9) A threat countermeasure method according to a ninth aspect includes deciding a position of an upper end of a blocking device 6 based on an upper end of a block region 20 in which lethality of laser irradiation is presumed to be lower than a predetermined threshold value, installing the blocking device 6 to block passage of an incoming threat 4 through the block region 20 to approach a protection target 3, and detecting the threat 4 to counter the threat 4 with the laser irradiation.

In the threat countermeasure method according to the ninth aspect, an effect is achieved that it is possible to guide the threat 4 to the outer side of the block region 20 with the blocking device 6 to counter the threat 4 with the laser irradiation.

This application claims priorities on the basis of Japanese Patent Application No. 2021-175405, filed Oct. 27, 2021, and the entire disclosure thereof is incorporated herein by reference.

The invention claimed is:

1. A threat countermeasure system comprising:
a countermeasure device that detects an incoming threat and counters the threat with laser irradiation;
a blocking device that is installed so as to block the approach of the threat to a protection target through a block region in which lethality of the laser irradiation is presumed to be lower than a predetermined threshold value; and
a decision device that decides a position of an upper end of the blocking device based on an upper end of the block region.

2. The threat countermeasure system according to claim 1, wherein the block region includes a space in which a refractive index structure constant is larger than a predetermined threshold value.

3. The threat countermeasure system according to claim 1, wherein the block region includes a space which is included in a blind spot as viewed from the countermeasure device.

4. The threat countermeasure system according to claim 1, wherein the block region is in front of an obstacle as viewed from the countermeasure device.

5. The threat countermeasure system according to claim 1, further comprising:
a drone that suspends and supports the blocking device.

6. The threat countermeasure system according to claim 1, further comprising:
another blocking device installed to compensate for a defective portion of the blocking device; and
a drone that suspends and supports the other blocking device.

7. The threat countermeasure system according to claim 1, wherein the countermeasure device includes
a threat detection unit that detects the threat and outputs a detection signal representing a position of the threat,
a laser irradiation unit that counters the threat with the laser irradiation, and
a control unit that controls the laser irradiation unit based on the detection signal.

8. The threat countermeasure system according to claim 7, further comprising:
a remote sensor that is installed away from the countermeasure device, detects the threat, and outputs a remote detection signal representing a position of the threat,
wherein the control unit controls the laser irradiation unit further based on the remote detection signal.

9. A threat countermeasure method comprising:
deciding a position of an upper end of a blocking device based on an upper end of a block region in which lethality of laser irradiation is presumed to be lower than a predetermined threshold value;
installing the blocking device to block passage of an incoming threat through the block region to approach a protection target; and
detecting the threat to counter the threat with the laser irradiation.

* * * * *